Patented Aug. 29, 1944

2,357,091

UNITED STATES PATENT OFFICE 2,357,091

DISPERSION OF PINE-WOOD PITCH-PHENOL-FORMALDEHYDE RESINOUS REACTION PRODUCTS

Gaetano F. D'Alelio, Pittsfield, Mass., assignor to General Electric Company, a corporation of New York No Drawing. Application April 17, 1941, Serial No. 389,043

4 Claims. (Cl. 260—25)

This invention relates to resinous compositions and molded products and to processes of making the same. The invention is especially concerned with potentially reactive phenolic resinous compositions containing resins known in the trade as "Vinsol" resins. More particularly, my invention relates to the preparation of molding compositions by suitably reacting a solution or dispersion of a phenol and Vinsol resin with an aldehyde under certain specified conditions to be described in detail hereinafter.

The Vinsol resins above referred to are pine wood pitches or resins obtained by extraction of pine wood and containing oxidized abietic and other resin acids, oxidized terpenes, polyphenols and polymerized terpenes. For brevity, these resins which are more fully described in Patent No. 2,060,856, issued to John M. DeBell, will be referred to hereinafter by their trade name or as extracted pine wood pitches or resins.

It has been proposed heretofore that resinous compositions be prepared by mixing Vinsol resins with phenol-aldehyde condensation products. However, these products in which the Vinsol resin is primarily used as a less expensive substitute for part of the phenolic resin and in which there is little, if any, interreaction between the two resin components, are not as free flowing or plastic as are the unadulterated phenolic resin products. This substitution has also been accompanied by an undesirable sacrifice in the strength of the molded products containing such mixed resin binders. In general, it has been necessary to dehydrate the phenolic resin before it is blended with the Vinsol resin and mixed with suitable fillers, etc. The resultant molding compositions were slow curing and in many instances it was necessary to cool the molds prior to extraction of the molded articles.

It is an object of this invention to provide relatively inexpensive, quick-curing compositions which are of improved flow characteristics and which can be wet-mixed with fillers and the like to produce molding compositions suitable for the production of strong molded articles of pleasing appearance.

I have found that the above object may be attained by mixing and reacting the various resin components together in a particular order under certain specified conditions.

In accordance with my invention, a solution or dispersion of Vinsol resin in a phenol or a mixture of phenols is first reacted under acid conditions with an aldehyde, specifically formaldehyde, in a ratio of approximately one mol of phenol to less than one mol and preferably 0.5–0.95 mol of aldehyde. The ingredients are caused to react preferably at the reflux temperature of the mixture and the reaction is continued until a major portion of the aldehyde has reacted. About fifteen minutes is usually sufficient. The mix is made alkaline and additional aldehyde is added until the mol ratio of total aldehyde exceeds 1:1. Preferably, the ratio is one mol of phenol to 1.2 to 1.5 mols of aldehyde. No apparent advantage is derived from the use of larger amounts thereof. The mixture is caused to react under alkaline conditions preferably at the reflux temperature until the major portion of the aldehyde has reacted. Preferably an analysis of the mixture at the end of this reaction period should show about 1.5 to 4.0 per cent residual aldehyde. A dispersing agent, e. g. natural gums, such as gum acacia, gum ghatti, gum tragacanth, etc., commercial dispersing agents, such as are sold under the trade names of Daxad, Hornkem, etc., esters of natural products, such as starch acetate, etc., is then added preferably while the mixture is still hot. The dispersion is neutralized to varying degrees with excellent dispersions being obtained when the neutralization is carried to a pH of about 7.0 to 8.0. More of the dispersing agent is added to the neutralized produce followed by the addition of an aldehyde reactable base such as ammonia, or a primary or secondary amine, to prevent loss of the aldehyde in the subsequent processing operations.

The potentially reactive liquid resin varnish so obtained is preferably wet-mixed directly with a fibrous or other filler material, lubricants, dyes, pigments, etc., to form mixtures more easily and economically dehydrated than are the original liquid resins. The dried material is processed by any of the known methods to produce an excellent moldable material. Such molding compositions may suitably comprise the following properly blended and dried ingredients:

| | Parts by weight |
|---|---|
| Resin varnish solids | 30–70 |
| Fibrous filler | 30–70 |
| Lubricant | 0–10 |
| Dye | 0–5 |
| Base | 0–10 |

Vinsol-containing molding compositions comprising up to 35 per cent Vinsol and exhibiting no loss of strength as compared with comparable straight phenol-aldehyde molding compositions may be prepared in accordance with my invention. Even larger amounts of Vinsol resins may be incorporated into phenolic resins by my process to produce products correspondingly stronger than the Vinsol-phenolic resin compositions of the prior art.

In order that those skilled in the art may better understand how the present invention may be carried into effect, the following examples, in which all proportions are in parts by weight, are given:

EXAMPLE I

*Resin varnish preparation*

|  | Parts |
|---|---|
| 82% phenol | 141.00 (1.45 mols) |
| No. 8 Cresol | 164.00 (1.52 mols) |
| Vinsol | 61.00 |
| No. 1 formaldehyde (37.2% solution) | 121.00 (1.5 mols) |
| No. 1 sulphuric acid (12.25% solution) | 5.75 |

The 82 per cent phenol, a commercial product containing approximately 82 to 84 per cent phenol, 3 to 4 per cent ortho cresol and 12 to 15 per cent of a mixture of meta cresol, para cresol and xylenols and the No. 8 Cresol containing about 4.5 per cent phenol, 2 to 4 per cent ortho cresol, 42 to 47 per cent meta cresol and the balance para cresol and xylenols, were mixed in a reaction vessel equipped with a stirrer and condenser and heated to about 40° to 50° C. before the Vinsol is added. After the Vinsol resin had dissolved, the aldehyde and the sulphuric acid catalyst were added to produce a reaction mixture having a pH of about 0.7 which mixture was then heated to reflux temperature for 15 minutes. The reaction was temporarily interrupted by cooling and 4.8 parts lime dissolved in 18 parts water and an additional 194 parts (2.4 mols) of 37.2 per cent formaldehyde solution were added. The resultant mixture having a pH of 7.85 was heated to reflux temperature and held at this point for an additional thirty minutes. The free formaldehyde content of this product was 3.5 per cent. A dispersing agent in the form of 19.5 parts of a 20 per cent acacia solution was added to the mixture which was then neutralized by the slow addition of 10 parts of a 12.25 per cent sulphuric acid solution to a pH of 6.78. Another 19.5 parts of the acacia solution were added followed by the slow addition of sufficient ammonium hydroxide solution to convert all the residual formaldehyde to hexamethylenetetramine. Twenty-seven parts of a 28.5 per cent ammonia solution were sufficient to lower free aldehyde content to 1.07 per cent. The finished varnish samples were dispersions containing 47 per cent resin solids capable of curing in 30 to 40 seconds on a 150° C. hot plate.

*Molding compound preparation*

|  | Parts |
|---|---|
| Resin varnish solids | 305 |
| Wood flour | 374 |
| Zinc stearate | 4 |
| Lime | 8 |
| Nigrosine | 14 |

In this and subsequent examples sufficient resin varnish or dispersion was used to furnish the specified amounts of resin solids.

The resin varnish and filler, etc., were well mixed by hand and rubbed through a screen to insure uniform distribution of the resin and dye. This mixture was dried at 70° to 75° C. in a hot air oven for two and one-half hours and processed for 40 seconds on differential rolls with the back roll cooled with water and the front roll heated with 30 lbs. per square inch of steam. The molding powder prepared from the sheeted material cured in a mold held at from 175° to 185° C. and approximately 2000 lbs. per square inch pressure in less than one minute to form molded products having excellent gloss and color, a dielectric strength at 100° C. in oil of 133 volts per mil, a Dynstat impact strength of 0.043 foot pound, a Dynstat flexural strength of 10.321 pounds per square inch, and a Dynstat degree bend of 5 degrees. The water absorption in boiling water of a quadrant of a molded 4 inch circular disk cured 2 minutes was 1.53 per cent.

EXAMPLE II

|  | Parts |
|---|---|
| 82% phenol (3-4 ortho cresol) | 141.00 (1.45 mols) |
| No. 8 Cresol | 164.00 (1.52 mols) |
| Vinsol | 61.00 |
| No. 1 formaldehyde (37.2% solution) | 121.00 (1.5 mols) |
| No. 1 sulphuric acid (12.25% solution) | 5.75 |

The phenol and cresol were mixed in a reaction vessel equipped with a stirrer and condenser and heated to about 40° to 50° C. The Vinsol resin was added and after it had dissolved, the formaldehyde and the sulphuric acid catalyst were introduced to form a mixture having a pH of 0.9. This acid mixture was heated to reflux and reacted at that temperature for 15 minutes. After the reaction mixture was cooled to stop the reaction, it was converted to a pH of 8.5 by the addition of 25 parts of a 20 per cent sodium hydroxide solution and 194 parts (2.4 mols) of a formaldehyde solution of 37.2 per cent concentration. The alkaline mixture was then heated to reflux for an additional 30 minutes and again cooled sufficiently to stop the reaction. At the end of this time, 19.5 parts of a 20 per cent acacia solution were added and the excess base neutralized by the slow addition of 10 parts of a 12.25 per cent sulphuric acid solution. An additional 19.5 parts of the 20 per cent acacia solution was introduced and the excess formaldehyde is converted to a nitorgen derivative by the slow addition of 36 parts of a 28.5 per cent ammonium hydroxide solution calculated as being necessary to react with all the residual formaldehyde to form hexamethylenetetramine. The dispersion so obtained contained 85 per cent resin solids and had a pH of 8.12. It cured in 75 seconds on a 150° C. hot plate.

*Molding compound preparation*

|  | Parts |
|---|---|
| Resin varnish solids | 275.0 |
| Wood flour | 280.5 |
| Zinc stearate | 3.0 |
| Lime | 6.0 |
| Nigrosine | 10.5 |

The mixing and drying of the resin varnish and filler were carried out as under Example I and the dried mixture processed on the rolls for 100 seconds, ground and screened through a 16 mesh screen.

Tests on compound under same conditions as Example I showed it to have a cure time of less than one minute and the molded products of good appearance possessed a dielectric strength of 75 volts per mil. A. S. T. M. test bars of the molded material showed a Charpy impact strength of 0.88 foot pound and a Dynstat impact of 0.039 foot pound. The water absorption of a piece boiled in water for one hour was 1.49 per cent.

EXAMPLE III

| | Parts | |
|---|---|---|
| 82% phenol | 322.00 | (3.31 mols) |
| No. 8 cresol | 378.00 | (3.5 mols) |
| Vinsol | 140.00 | |
| No. 1 formaldehyde (37.2% solution) | 276.00 | (3.42 mols) |
| No. 1 sulphuric acid | 1.61 | |

The above ingredients were heated and mixed in the same order as given under Example II to obtain a product which after 15 minutes reaction at reflux temperature had a pH of 1.4 and a free formaldehyde content of 1.9 per cent. The cooled reaction mixture was made alkaline by the addition of 11.4 parts sodium hydroxide dissolved in 40 parts water. An additional 444 parts (5.47 mols) formaldehyde were added and the resultant mixture again reacted at reflux temperature for 30 minutes. After this reaction had then been interrupted by cooling the mixture, which had a pH of 7.5, 41.25 parts of a 20 per cent acacia solution were added and the excess alkali neutralized by the addition of 2.8 parts by weight of sulphuric acid diluted in 24 parts water. Another 41.25 parts of the 20 per cent acacia solution were added at a temperature of 60° to 70° C. followed by the slow addition of 83 parts of a 28.5 per cent aldehyde-fixing ammonia solution. The amount of ammonia solution used was again that calculated as necessary to convert all the residual formaldehyde present at the end of the alkaline reaction period to hexamethylenetetramine.

The resulting dispersion containing 53 per cent solids was very uniform and very well dispersed. It cured in 80 seconds on a 150° C. hot plate.

*Molding compound preparation*

| | Parts |
|---|---|
| Resin varnish solids | 41.0 |
| Wood flour | 33.5 |
| Walnut flour | 13.9 |
| Asbestos floats | 7.5 |
| Nigrosine | 2.0 |
| Zinc stearate | 0.4 |
| Vegetable wax | 0.4 |
| Lime | 1.3 |

The fillers, etc., which had been premixed, were placed in a continuous mixer and the resin varnish added thereto. When sufficient mixing had taken place to produce a homogeneous blend, the mixture was dried and processed for 60 seconds in a Banbury mixer maintained at 100° C. Molding powder prepared therefrom cured in 60 seconds at 165° C. mold temperature to form molded articles comparable with those of Example II.

In general, molded parts produced in accordance with this invention will show a Charpy impact strength of not less than 0.80 foot pounds on the A. S. T. M. usual test bars, a flexural strength of not less than 8000 pounds per square inch and a shrinkage of about 9 mils per inch. The water absorption thereof is uniformly low, ordinarily below 2 per cent.

What I claim as new and desire to secure by Letters Patent of the United States is:

1. The process of preparing a potentially reactive resinous composition which comprises forming a solution consisting of extracted pine wood pitch dissolved in a phenol, reacting said solution with from 0.5 to 0.95 mol formaldehyde per mol phenol in the presence of an acid catalyst and at reflux temperatures for a period of time sufficient to react a major portion of the formaldehyde, adding sufficient alkali to convert the reaction mixture to an alkaline condition, reacting the alkaline reaction mixture at reflux temperatures with additional formaldehyde in an amount such that the total mol formaldehyde content of the reaction mixture is in excess of one mol formaldehyde per mol phenol, continuing said alkaline reaction until all but about 1.5 to 4.0 per cent of the formaldehyde has reacted, introducing a dispersing agent into the hot alkaline resinous reaction product, at least partially neutralizing the excess alkali content of said alkaline mixture to a pH of about 7.0 to 8.0, and introducing additional dispersing agent and sufficient ammonia to react with the free aldehyde contained in said neutralized mixture to form a dispersion of the resinous product, the said pine wood pitch comprising a substantial proportion of the resinous reaction product.

2. The potentially reactive resinous composition obtained by the process of claim 1.

3. The process of preparing a dispersion of a potentially reactive resinous composition which comprises forming a solution consisting of about 61 parts extracted pine wood pitch in about 300 parts by weight of a phenol, reacting said solution under acid conditions with from 0.5 to 0.95 mol formaldehyde per mol phenol under acid conditions and at reflux temperatures for a period of about 15 minutes, adding sufficient alkali to convert the reaction mixture to alkaline condition, reacting the alkaline reaction mixture at reflux temperatures with additional formaldehyde in such proportions that the ratio of total aldehyde content of the reaction mixture to the phenol content thereof is greater than 1:1 and less than 1.5:1, continuing the alkaline reaction under reflux conditions until all but about 1.5 to 4 per cent of the total formaldehyde has reacted, introducing a dispersing agent into the hot alkaline resinous reaction product, at least partially neutralizing the excess alkali content of said alkaline mixture to a pH of about 7.0 to 8.0, and introducing additional dispersing agent and sufficient ammonia to react with the free aldehyde contained in said neutralized mixture to form a dispersion of the resinous product.

4. The resin dispersion obtained by the process of claim 3.

GAETANO F. D'ALELIO.

CERTIFICATE OF CORRECTION.

Patent No. 2,357,091.  August 29, 1944.

GAETANO F. D'ALELIO.

It is hereby certified that error appears in the printed specification of the above numbered patent requiring correction as follows: Page 2, second column, line 11, Example I, for "10.321" read --10,321--; line 19, Example II, for "(3-4 ortho cresol)" read --(3-4% ortho cresol)--; line 48, same example, for "nitorgen" read --nitrogen--; and that the said Letters Patent should be read with this correction therein that the same may conform to the record of the case in the Patent Office.

Signed and sealed this 31st day of October, A. D. 1944.

(Seal)

Leslie Frazer
Acting Commissioner of Patents.